US012755511B2

(12) United States Patent
Saeki et al.

(10) Patent No.: US 12,755,511 B2
(45) Date of Patent: Oct. 6, 2026

(54) IMAGE ANALYZER FOR MATERIAL STRUCTURE USING FOURIER TRANSFORM AND PRINCIPAL COMPONENT ANALYSIS

(71) Applicant: TOYOTA JIDOSHA KABUSHIKI KAISHA, Toyota (JP)

(72) Inventors: Kazuho Saeki, Yokohama (JP); Hanae Shiratori, Gotenba (JP); Masao Yano, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 18/674,563

(22) Filed: May 24, 2024

(65) Prior Publication Data

US 2025/0029361 A1 Jan. 23, 2025

(30) Foreign Application Priority Data

Jul. 19, 2023 (JP) ................................ 2023-117830

(51) Int. Cl.
*G06V 10/74* (2022.01)
*G01N 23/201* (2018.01)
(Continued)

(52) U.S. Cl.
CPC .............. *G06V 10/761* (2022.01); *G06T 7/00* (2013.01); *G06T 7/40* (2013.01); *G06V 10/44* (2022.01);
(Continued)

(58) Field of Classification Search
CPC .... G06V 10/761; G06V 10/44; G06V 10/431; G06V 10/7715; G06T 7/40;
(Continued)

(56) References Cited

U.S. PATENT DOCUMENTS

| | | | | |
|---|---|---|---|---|
| 2021/0080409 A1* | 3/2021 | Wang | .................. | G01N 23/201 |
| 2021/0241176 A1 | 8/2021 | Yoo et al. | | |
| 2024/0273701 A1* | 8/2024 | Nishi | ................ | G01N 29/0672 |

FOREIGN PATENT DOCUMENTS

| | | |
|---|---|---|
| JP | 2017-091526 A | 5/2017 |

OTHER PUBLICATIONS

Bharati, Manish H., J. Jay Liu, and John F. MacGregor. "Image texture analysis: methods and comparisons." Chemometrics and intelligent laboratory systems 72.1 (2004): 57-71. (Year: 2004).*

(Continued)

*Primary Examiner* — Ross Varndell
(74) *Attorney, Agent, or Firm* — Oliff PLC

(57) ABSTRACT

For easy visualization of features of an image representing a structure of a material, an image analyzer includes a transformer that performs a Fourier transform on each of a plurality of original images representing a structure of a material and acquires a plurality of power spectra; an analyzer that performs principal component analysis on the plurality of power spectra and acquires principal components and principal component scores; and a reconstructor that reconstructs an image based on the principal components and principal component scores and outputs a feature image representing features of the original image. The reconstructor generates a difference image based on a reconstructed changed image obtained by changing one or more of the principal component scores and a reference image, and outputs the generated difference image as the feature image. The principal component score to be changed may be determined using a trained regression/classification model constructed by machine learning.

4 Claims, 6 Drawing Sheets

(51) Int. Cl.

| | |
|---|---|
| ***G06F 17/16*** | (2006.01) |
| ***G06T 7/00*** | (2017.01) |
| ***G06T 7/40*** | (2017.01) |
| ***G06T 11/00*** | (2026.01) |
| ***G06V 10/42*** | (2022.01) |
| ***G06V 10/44*** | (2022.01) |
| ***G06V 10/77*** | (2022.01) |

(52) U.S. Cl.

CPC ..... *G01N 23/201* (2013.01); *G01N 2223/054* (2013.01); *G01N 2223/1016* (2013.01); *G01N 2223/41* (2013.01); *G06F 17/16* (2013.01); *G06T 7/0004* (2013.01); *G06T 11/00* (2013.01); *G06T 2207/10056* (2013.01); *G06T 2207/20056* (2013.01); *G06T 2207/20076* (2013.01); *G06T 2207/30108* (2013.01); *G06T 2207/30156* (2013.01); *G06V 10/431* (2022.01); *G06V 10/7715* (2022.01)

(58) Field of Classification Search

CPC ............. G06T 2207/20056; G06T 7/00; G06T 2207/10056; G06T 2207/20076; G06T 2207/20224; G06T 2207/30156; G06T 7/0002; G06T 7/0004; G06T 11/00; G06T 2207/30108; G01N 23/201; G01N 2223/054; G01N 2223/1016; G01N 2223/41; G01N 21/84; G06F 17/16

See application file for complete search history.

(56) References Cited

OTHER PUBLICATIONS

Wang, Fu-liang, and Bo Zuo. “Detection of surface cutting defect on magnet using Fourier image reconstruction.” Journal of Central South University 23.5 (2016): 1123-1131. (Year: 2016).*

Saito, Kotaro, et al. “Accelerating small-angle scattering experiments on anisotropic samples using kernel density estimation.” Scientific reports 9.1 (2019): 1526. (Year: 2019).*

* cited by examiner 101
102
103
104
105
106
107
108
pc1
pc2
pc3
pc4
pc5
pc6
pc7
pc8
pc9
pc10
-0.71
0.02
0.22
2.82
-0.35
0.09
0.43
-0.28
1.64
0.53
0 SET
RESET
Entire frequency range
Specified frequency range
Reconstructed
Changed
difference
Power (intensity)
Frequency

IMAGE ANALYZER FOR MATERIAL STRUCTURE USING FOURIER TRANSFORM AND PRINCIPAL COMPONENT ANALYSIS

CROSS REFERENCE TO RELATED APPLICATIONS

The present application claims priority from Japanese patent application JP 2023-117830 filed on Jul. 19, 2023, the entire content of which is hereby incorporated by reference into this application.

BACKGROUND

Technical Field

The present disclosure relates to an image analyzer.

Background Art

JP 2017-91526 A discloses a method for searching a new material, including performing a machine learning to learn a relationship between structure information and physical property information of a known material and determining at least one candidate material by inputting a targeted physical property to a learned model obtained by the learning.

SUMMARY

Techniques now used to develop new materials or the like include extracting feature amounts from images obtained by imaging a material and determining whether an extracted feature amount is an important feature amount that affects the performance of the material. At this time, visualization of which region in the image is changed by a change in the feature amount is desired.

The present disclosure has been made in view of the foregoing, and allows easy visualization of the features of the image representing the structure of the material.

In view of the foregoing, an image analyzer of the present disclosure includes: a transformer configured to perform a Fourier transform on each of a plurality of original images representing a structure of a material and acquire a plurality of power spectra; an analyzer configured to perform principal component analysis on the plurality of power spectra and acquire principal components and principal component scores; and a reconstructor configured to reconstruct an image based on the principal components and principal component scores and output a feature image representing features of the original image. The reconstructor generates a difference image based on a reconstructed changed image obtained by changing one or more of the principal component scores and a reference image, and outputs the generated difference image as the feature image.

According to the present disclosure, the features of the image representing the structure of the material can easily be visualized.

DETAILED DESCRIPTION

Figure 1:
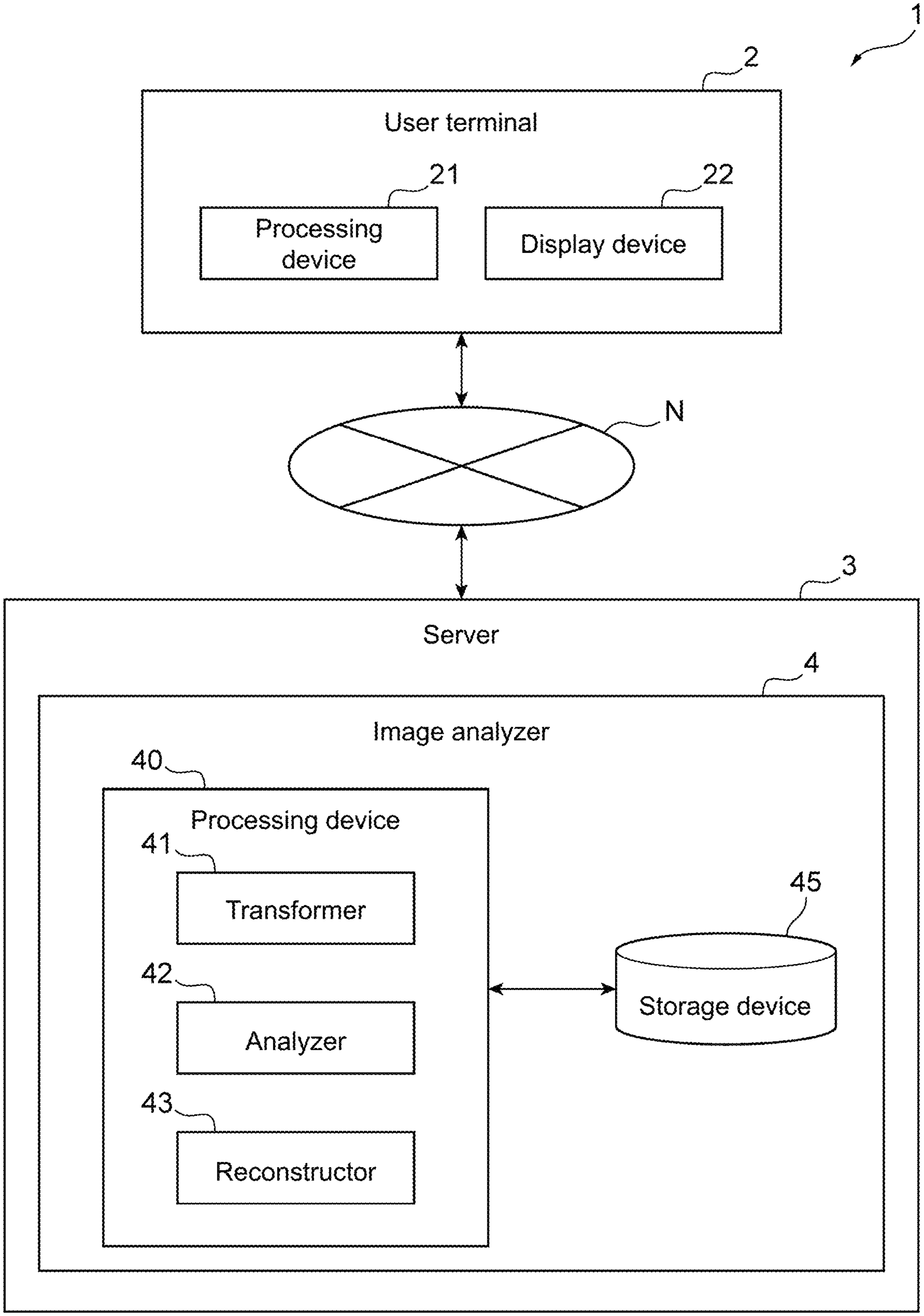
FIG. 1 is a diagram illustrating a configuration of an information processing system including an image analyzer of a first embodiment.

Hereinafter, embodiments of the present disclosure will be described with reference to the drawings. Configurations or functions denoted by the same reference numerals in the embodiments have the same configurations or functions in the embodiments unless otherwise specified, and description thereof will be omitted.

First Embodiment

Figure 2:
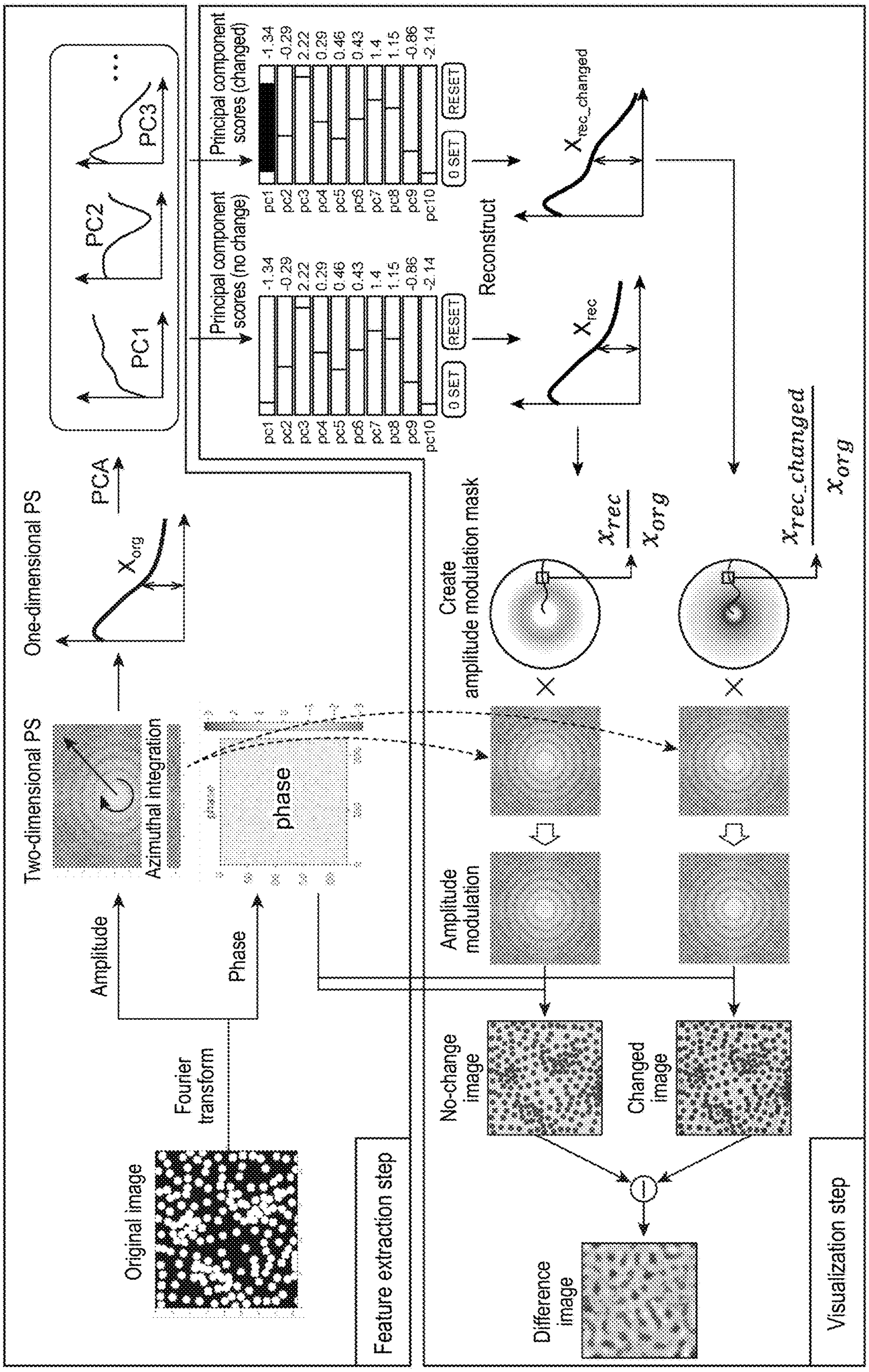
FIG. 2 is a diagram for explaining a function of the image analyzer of FIG. 1.

An image analyzer 4 of a first embodiment will be described referring to FIG. 1 to FIG. 3. FIG. 1 is a diagram illustrating a configuration of an information processing system 1 including the image analyzer 4 of the first embodiment. FIG. 2 is a diagram for explaining a function of the image analyzer 4 of FIG. 1.

The information processing system 1 is configured to analyze images inputted by a user using the image analyzer 4 and to present analysis results to the user. The information processing system 1 includes a user terminal 2 and a server 3 including the image analyzer 4. The user terminal 2 and the server 3 are communicatively connected via a network N.

The user terminal 2 includes a processing device 21 and a display device 22. The processing device 21 includes a processor and a memory, and implements the function of the user terminal 2 when the processor executes a program. The display device 22 is constituted by a display and displays a process result of the processing device 21.

The user terminal 2 receives images inputted by the user and transmits the images to the image analyzer 4 of the server 3. The user terminal 2 receives and displays analysis results of the image analyzer 4 from the server 3 and presents them to the user.

The image analyzer 4 performs processes of extracting a feature amount from the image inputted by the user and visualizing which region in the image is changed by a change in the feature amount. The image to be analyzed (hereinafter also referred to as the “original image”) by the image analyzer 4 is, for example, an image representing the structure of a material. The image representing the structure of the material is, for example, an image obtained by capturing the material with a microscope or an image simulating the captured image. The material is, for example, a metal material, resin material, or coating material used for vehicles. For example, the surface texture of the metal material varies depending on the type of metal to be combined and its composition. It is not easy for the user to grasp a difference in the surface texture from images. Therefore, the image analyzer 4 extracts feature amounts from a plurality of input images and visualizes which region in the image is changed by a change in the feature amount. Accordingly, the image analyzer 4 allows the user to more easily grasp an important feature amount that affects the performance of the material. The performance of the material is, for example, battery performance, magnet performance, rigidity, thermoplasticity, tensile performance, or mechanical durability.

The image analyzer 4 includes a processing device 40 and a storage device 45. The storage device 45 is configured by a storage that stores an image received from the user terminal 2 and an analysis result of the image analyzer 4. The processing device 40 includes a processor and a memory, and implements various functions when the processor executes programs. As such functions, the processing device 40 includes a transformer 41, an analyzer 42, and a reconstructor 43.

The transformer 41 performs a Fourier transform on each of a plurality of original images and acquires an amplitude spectrum and a phase spectrum of each original image. The transformer 41 acquires a two-dimensional power spectrum by squaring the acquired amplitude spectrum. As illustrated in FIG. 2, the two-dimensional power spectrum is represented such that the power spectrum is centered at the origin and spanned from the center in frequency space. The transformer 41 performs azimuthal integration on the two-dimensional power spectrum into one dimension, and acquires a one-dimensional power spectrum. The one-dimensional power spectrum is illustrated by a plot, where the horizontal axis is the frequency and the vertical axis is the power value (intensity). In FIG. 2, the one-dimensional power spectrum of the original image is denoted by "Xorg." A single one-dimensional power spectrum is acquired from a single image.

As described above, the transformer 41 performs a Fourier transform on each of the plurality of original images and acquires a plurality of one-dimensional power spectra. The image analyzer 4 can reduce the number of dimensions in the data to be analyzed by acquiring, as a one-dimensional power spectrum, periodic structure information derived from the size, shape, and arrangement of the structure in the original image.

The analyzer 42 performs principal component analysis on the plurality of one-dimensional power spectra acquired by the transformer 41 and acquires principal components and principal component scores. The principal components are represented as vectors including elements of, for example, a first principal component PC1, a second principal component PC2, a third principal component PC3, and the like. The principal component indicates a spectral component with large variance in a data group of the plurality of one-dimensional power spectra. The principal component score indicates a proportion of each of the principal components contained.

The reconstructor 43 reconstructs an image based on the principal components and principal component scores acquired by the analyzer 42 and outputs a feature image representing the features of the original image. At this time, the reconstructor 43 changes one or more of the principal component scores and generates a reconstructed image (hereinafter also referred to as the "changed image"). The reconstructor 43 generates a difference image based on the generated changed image and a reference image. The reconstructor 43 outputs the generated difference image as the feature image. The reference image is, for example, the original image. Alternatively, the reference image is a reconstructed image obtained without changing the principal component scores (hereinafter also referred to as the "no-change image"). The reconstructor 43 of the present embodiment employs the no-change image as the reference image.

The value of the changed principal component score is set to the reconstructor 43 by the user entering a value to the user terminal 2 and then the user terminal 2 transmitting it to the server 3. The reconstructor 43 changes the principal component score according to the set value. The reconstructor 43 reconstructs a one-dimensional power spectrum on the basis of the principal components acquired by the analyzer 42 and the principal component scores after the change. In FIG. 2, the reconstructed one-dimensional power spectrum obtained by changing one or more of the principal component scores is denoted by "Xrec_changed."

The reconstructor 43 calculates a first rate (Xrec_changed/Xorg) indicating a rate of change of the reconstructed one-dimensional power spectrum obtained by changing one or more of the principal component scores with respect to the one-dimensional power spectrum of the original image. The reconstructor 43 modulates the amplitude spectrum of the original image according to the calculated first rate. For example, the reconstructor 43 creates a mask for modulating the two-dimensional power spectrum of the original image according to the calculated first rate. The reconstructor 43 modulates the amplitude spectrum of the original image according to the first rate by multiplying the created mask by the two-dimensional power spectrum. The reconstructor 43 performs an inverse Fourier transform on the amplitude spectrum modulated according to the first rate and on the phase spectrum, thus generating a changed image.

In addition, the reconstructor 43, on the basis of the principal components acquired by the analyzer 42 and the principal component scores before the change, reconstructs a one-dimensional power spectrum. In FIG. 2, the reconstructed one-dimensional power spectrum obtained without changing the principal component scores is denoted by "Xrec."

The reconstructor 43 calculates a second rate (Xrec/Xorg) indicating a rate of change of the reconstructed one-dimensional power spectrum obtained without changing the principal component scores with respect to the one-dimensional power spectrum of the original image. The reconstructor 43 modulates the amplitude spectrum of the original image according to the calculated second rate. The reconstructor 43 performs an inverse Fourier transform on the amplitude spectrum modulated according to the second rate and on the phase spectrum, thus generating a no-change image.

Then, the reconstructor 43 generates a difference image based on the generated changed image and no-change image. The reconstructor 43 outputs the generated difference image as the feature image representing the features of the original image. The feature image outputted from the reconstructor 43 is transmitted to the user terminal 2, and displayed on the display device 22.

Figure 3:
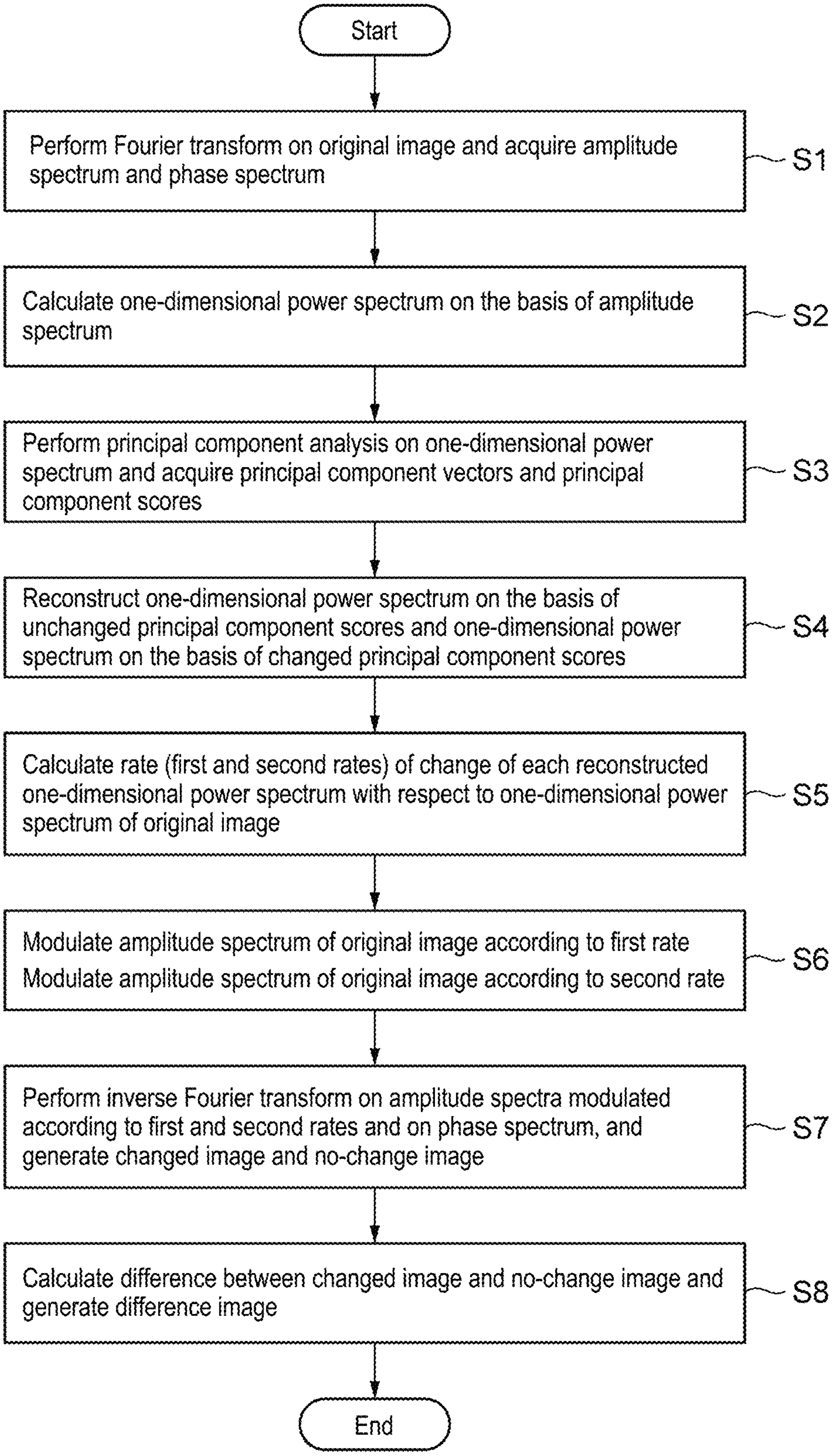
FIG. 3 is a flowchart illustrating a process performed by the image analyzer of FIG. 1.

FIG. 3 is a flowchart illustrating a process performed by the image analyzer 4 of FIG. 1.

In step S1, the processing device 40 performs a Fourier transform on each of the plurality of original images and acquires an amplitude spectrum and a phase spectrum of each original image.

In step S2, the processing device 40 calculates a one-dimensional power spectrum of each original image on the basis of each acquired amplitude spectrum.

In step S3, the processing device 40 performs principal component analysis on the plurality of one-dimensional power spectra calculated and acquires principal component vectors and principal component scores.

In step S4, the processing device 40 reconstructs a one-dimensional power spectrum on the basis of the changed principal component score values. The processing device 40 reconstructs a one-dimensional power spectrum on the basis of the unchanged principal component score values.

In step S5, the processing device 40 calculates a first rate indicating a rate of change of the reconstructed one-dimensional power spectrum obtained by changing one or more of the principal component scores with respect to the one-dimensional power spectrum of the original image. The processing device 40 calculates a second rate indicating a rate of change of the reconstructed one-dimensional power spectrum obtained without changing the principal component scores with respect to the one-dimensional power spectrum of the original image.

In step S6, the processing device 40 modulates the amplitude spectrum of the original image according to the calculated first rate. The processing device 40 modulates the amplitude spectrum of the original image according to the calculated second rate.

In step S7, the processing device 40 performs an inverse Fourier transform on the amplitude spectrum modulated according to the first rate and on the phase spectrum, and generates a changed image. The processing device 40 performs an inverse Fourier transform on the amplitude spectrum modulated according to the second rate and on the phase spectrum, and generates a no-change image.

In step S8, the processing device 40 calculates a difference between the changed image and the no-change image and generates a difference image. The processing device 40 outputs the generated difference image as the feature image representing the features of the original image to the storage device 45, and stores it in the storage device 45. The processing device 40 outputs the feature image stored in the storage device 45 to a communication device of the server 3. The communication device of the server 3 transmits the difference image outputted from the processing device 40 to the user terminal 2. The user terminal 2 displays the difference image transmitted from the server 3 on the display device 22.

As described above, the image analyzer 4 of the first embodiment includes the transformer 41 that performs a Fourier transform on each of a plurality of original images representing the structure of a material and acquires a plurality of power spectra (one-dimensional power spectra); the analyzer 42 that performs principal component analysis on the plurality of power spectra and acquires principal components and principal component scores; and the reconstructor 43 that reconstructs an image on the basis of the principal components and principal component scores and outputs a feature image representing the features of the original image. The reconstructor 43 generates a difference image based on a reconstructed changed image obtained by changing one or more of the principal component scores and a reference image and outputs the generated difference image as the feature image.

Accordingly, the image analyzer 4 acquires, as a power spectrum, periodic structure information of the original image and thus can reduce the number of dimensions of the data to be analyzed. The image analyzer 4 performs principal component analysis on the plurality of power spectra and thus can relatively simply extract a feature amount of the original image as the principal component score. The image analyzer 4 generates and outputs the difference image based on the reconstructed changed image obtained by changing one or more of the principal component scores and the reference image, and thus can directly reflect, on the image, a change in the principal component scores that causes a change in the image. Therefore, the image analyzer 4 can easily visualize which region in the image is changed by the change in the feature amount, and allows the user to more easily grasp the change by intuition. Thus, the image analyzer 4 can easily visualize the features of the image representing the structure of the material.

Furthermore, in the image analyzer 4 of the first embodiment, the reconstructor 43 generates the reconstructed no-change image obtained without changing the principal component scores as the reference image, and generates and outputs a difference image.

Accordingly, the image analyzer 4 compares the reconstructed images (the changed image and the no-change image) and generates the difference image, and thus can prevent an error caused during reconstruction from being reflected on the difference image. The image analyzer 4 can easily and precisely visualize which region in the image is changed by the change in the feature amount. Thus, the image analyzer 4 can easily and precisely visualize the features of the image representing the structure of the material.

Furthermore, in the image analyzer 4 of the first embodiment, the transformer 41 performs a Fourier transform on the original image to acquire an amplitude spectrum and a phase spectrum, and calculates a power spectrum on the basis of the acquired amplitude spectrum. The reconstructor 43 calculates a first rate indicating a rate of change of the reconstructed power spectrum obtained by changing one or more of the principal component scores with respect to the power spectrum of the original image, and modulates the amplitude spectrum of the original image according to the calculated first rate. The reconstructor 43 generates the changed image based on the amplitude spectrum modulated according to the first rate and on the phase spectrum.

Accordingly, the image analyzer 4 can reconstruct the changed image and the no-change image without loss of phase information of the original image. The image analyzer 4 can easily associate the region in the changed image changed by a change in the principal component scores with the region in the no-change image. The image analyzer 4 can more easily and precisely visualize which region in the image is changed by the change in the feature amount. Thus, the image analyzer 4 can more easily and precisely visualize the features of the image representing the structure of the material.

Furthermore, in the image analyzer 4 of the first embodiment, the reconstructor 43 calculates a second rate indicating a rate of change of the reconstructed power spectrum obtained without changing the principal component scores with respect to the power spectrum of the original image, and modulates the amplitude spectrum of the original image according to the calculated second rate. The reconstructor 43 generates the no-change image based on the amplitude spectrum modulated according to the second rate and on the phase spectrum.

Accordingly, the image analyzer 4 can easily and precisely associate the region in the changed image changed by a change in the principal component scores with the region in the no-change image. The image analyzer 4 can more easily and more precisely visualize which region in the image is changed by the change in the feature amount. Thus, the image analyzer 4 can more easily and more precisely visualize the features of the image representing the structure of the material.

Second Embodiment

Figure 4:
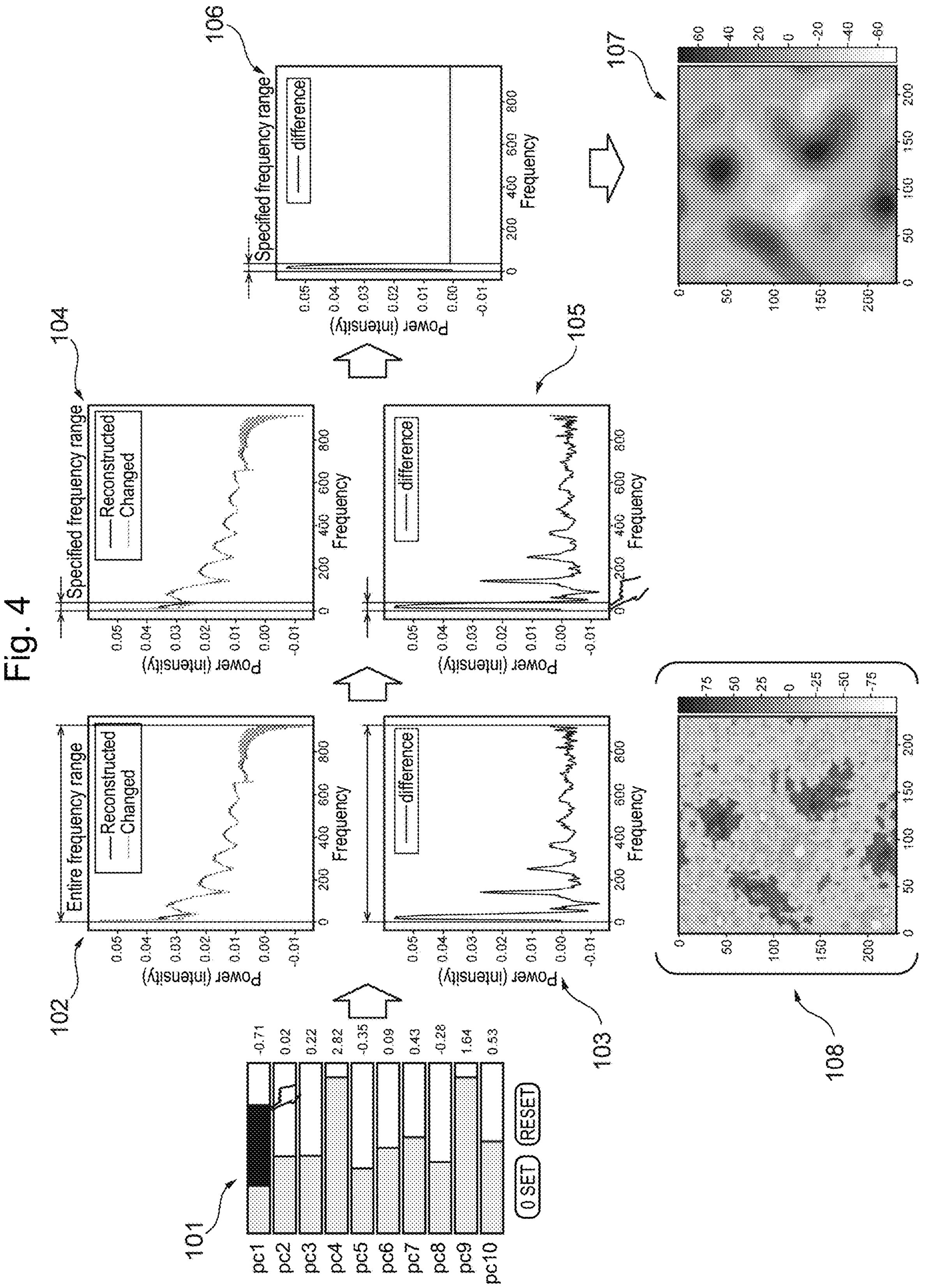
FIG. 4 is a diagram for explaining an image analyzer of a second embodiment.

Referring to FIG. 4, the image analyzer 4 of a second embodiment will be described. In the image analyzer 4 of the second embodiment, description of the configuration and operation similar to those of the first embodiment will be omitted. FIG. 4 is a diagram for explaining the image analyzer 4 of the second embodiment.

When the one-dimensional power spectrum of the original image includes peaks in a plurality of frequency ranges, the image analyzer 4 of the second embodiment may visualize the feature of which region in the image the peak in each frequency range represents. The image analyzer 4 of the second embodiment generates and outputs a difference image only in the frequency range specified by the user.

Specifically, when the principal component score changed by the user is set as shown by the reference numeral 101 of FIG. 4, the reconstructor 43 of the second embodiment reconstructs a one-dimensional power spectrum obtained by changing the principal component score and a one-dimensional power spectrum obtained without changing the principal component scores as shown by the reference numeral 102 of FIG. 4. Then, the reconstructor 43 calculates a differential power spectrum indicating a difference between the reconstructed one-dimensional power spectrum obtained by changing the principal component score and the reconstructed one-dimensional power spectrum obtained without changing the principal component scores as shown by the reference numeral 103 of FIG. 4. For example, the reconstructor 43 calculates a differential power spectrum by subtracting the power values of the reconstructed one-dimensional power spectrum obtained without changing the principal component scores from the power values of the reconstructed one-dimensional power spectrum obtained by changing the principal component score.

Then, when the user specifies the frequency range as shown by the reference numeral 104 and the reference numeral 105 of FIG. 4, the reconstructor 43 extracts a differential power spectrum in the specified frequency range from the calculated differential power spectrum as shown by the reference numeral 106 of FIG. 4. At this time, the reconstructor 43 sets power values of the one-dimensional power spectrum obtained by changing the principal component score in a portion other than the specified frequency range so as to be the same as the power values of the one-dimensional power spectrum obtained without changing the principal component scores. Accordingly, the reconstructor 43 can extract the differential power spectrum in the specified frequency range.

Then, the reconstructor 43 generates and outputs a difference image in the specified frequency range on the basis of the extracted differential power spectrum as shown by the reference numeral 107 of FIG. 4. Note that the reference numeral 108 of FIG. 4 shows a difference image in the entire frequency range.

Accordingly, even when the one-dimensional power spectrum of the original image includes peaks in the plurality of frequency ranges, the image analyzer 4 of the second embodiment can generate a difference image only in the specified frequency range. The image analyzer 4 of the second embodiment can visualize the feature of which region in the image each peak in the plurality of frequency ranges represents. Thus, the image analyzer 4 of the second embodiment can visualize in more detail the features of the image representing the structure of the material.

Third Embodiment

Figure 5:
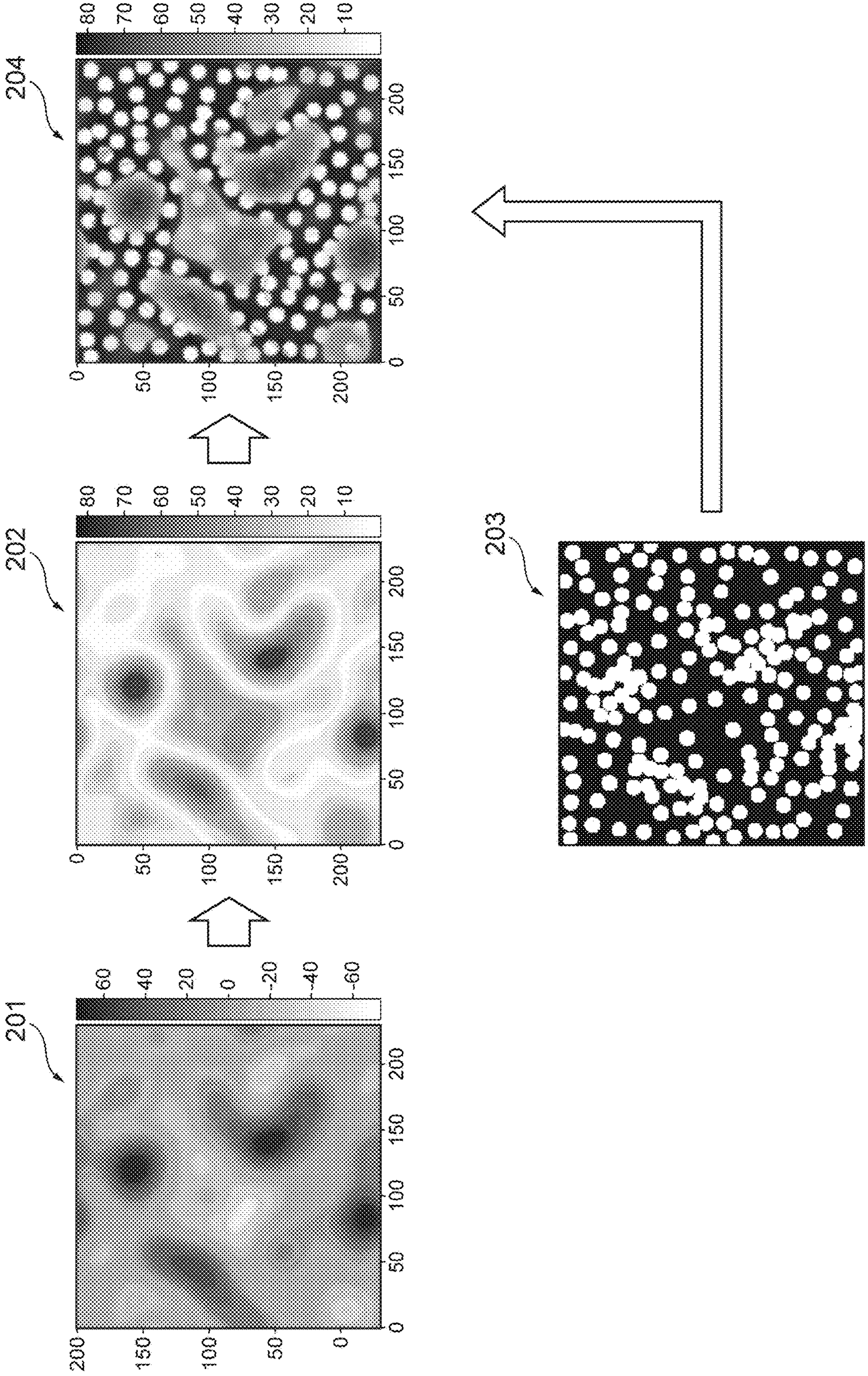
FIG. 5 is a diagram for explaining an image analyzer of a third embodiment.

Referring to FIG. 5, the image analyzer 4 of a third embodiment will be described. In the image analyzer 4 of the third embodiment, description of the configuration and operation similar to those of the first and second embodiments will be omitted. FIG. 5 is a diagram for explaining the image analyzer 4 of the third embodiment.

The image analyzer 4 of the third embodiment superimposes, on the original image, a difference image in which the power values of the differential power spectrum are converted into absolute values and outputs the result.

Specifically, as shown by the reference numeral 201 of FIG. 5, the reconstructor 43 of the third embodiment calculates a differential power spectrum using the same technique as the reconstructor 43 of the second embodiment, and generates a difference image. Then, as shown by the reference numeral 202 of FIG. 5, the reconstructor 43 converts power values of the differential power spectrum into absolute values and generates a difference image including the absolute values. Then, the reconstructor 43 superimposes the difference image including the absolute values shown by the reference numeral 202 of FIG. 5 on the original image shown by the reference numeral 203 of FIG. 5. Then, as shown by the reference numeral 204 of FIG. 5, the reconstructor 43 outputs a synthesized image obtained by superimposing the difference image including the absolute values on the original image.

Accordingly, since the image analyzer 4 of the third embodiment superimposes the difference image on the original image, the image analyzer 4 of the third embodiment can visualize which region in the image is changed by the change in the feature amount in a way that is more understandable to the user. Since the image analyzer 4 of the third embodiment generates the difference image including the absolute values, the image analyzer 4 of the third embodiment can visualize which region in the image is greatly changed by the change in the feature amount in a way that is more understandable to the user. Thus, the image analyzer 4 of the third embodiment can visualize the features of the image representing the structure of the material in a way that is more understandable to the user.

Fourth Embodiment

Figure 6:
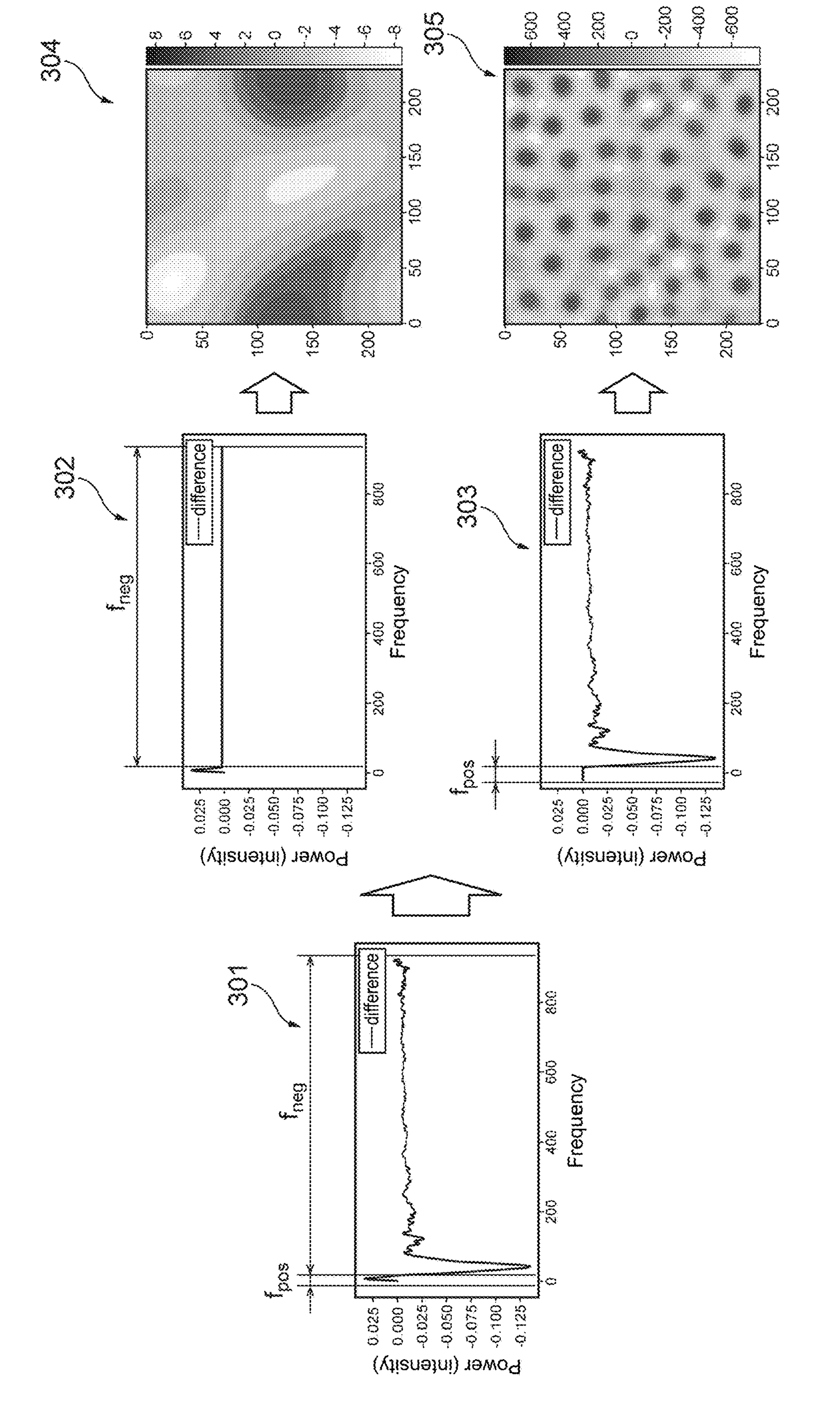
FIG. 6 is a diagram for explaining an image analyzer of a fourth embodiment.

Referring to FIG. 6, the image analyzer 4 of a fourth embodiment will be described. In the image analyzer 4 of the fourth embodiment, description of the configuration and operation similar to those of the first to third embodiments will be omitted. FIG. 6 is a diagram for explaining the image analyzer 4 of the fourth embodiment.

The image analyzer 4 of the fourth embodiment separately generates a difference image in a frequency range in which the power values of the differential power spectrum represent positive values and a difference image in a frequency range in which the power values of the differential power spectrum represent negative values, and outputs the difference images.

Specifically, as shown by the reference numeral 301 of FIG. 6, the reconstructor 43 of the fourth embodiment calculates a differential power spectrum using the same technique as the reconstructor 43 of the second embodiment. Then, the reconstructor 43 specifies a frequency range (fpos) in which the power values of the differential power spectrum represent positive values, and a frequency range (fneg) in which the power values of the differential power spectrum represent negative values.

Then, as shown by the reference numeral 302 of FIG. 6, the reconstructor 43 sets power values in the frequency range (fneg) representing a negative value so as to be the same as the power values of the one-dimensional power spectrum obtained without changing the principal component scores. Accordingly, the reconstructor 43 extracts a differential power spectrum in the frequency range representing a positive value. Likewise, as shown by the reference numeral 303 of FIG. 6, the reconstructor 43 sets power values in the frequency range (fpos) representing a positive value so as to be the same as the power values of the one-dimensional power spectrum obtained without changing the principal component scores. Accordingly, the reconstructor 43 extracts a differential power spectrum in the frequency range representing a negative value.

Then, as shown by the reference numeral 304 of FIG. 6, the reconstructor 43 generates and outputs a difference image on the basis of the differential power spectrum in the frequency range representing a positive value. Likewise, as shown by the reference numeral 305 of FIG. 6, the reconstructor 43 generates and outputs a difference image on the basis of the differential power spectrum in the frequency range representing a negative value. As described above, the reconstructor 43 separately generates a difference image in a frequency range representing a positive value and a difference image in a frequency range representing a negative value, and outputs the difference images.

Accordingly, the image analyzer 4 of the fourth embodiment can divide the entire frequency range into a frequency range in which the power value of the one-dimensional power spectrum increases according to the change in the principal component scores and a frequency range in which the power value of the one-dimensional power spectrum decreases according to the change in the principal component scores, and generate difference images. The image analyzer 4 of the fourth embodiment can separately visualize the feature of which region in the image the frequency range positively correlated with a change in the feature amount represents and the feature of which region in the image the frequency range negatively correlated with a change in the feature amount represents. Thus, the image analyzer 4 of the fourth embodiment can visualize in more detail the features of the image representing the structure of the material.

Note that the user terminal 2 may receive a plurality of material performance values (material characteristics) that are inputted by the user and respectively tied to the plurality of original images, and transmit the received values to the image analyzer 4 of the server 3. The storage device 45 of the image analyzer 4 stores the plurality of original images and the plurality of material performance values received from the user terminal 2 in association with each other.

The processing device 40 of the image analyzer 4 may further include a determiner that determines a principal component score corresponding to an important feature amount that affects the performance of the material on the basis of a result of the principal component analysis by the analyzer 42. A determination result obtained by the determiner is transmitted to the user terminal 2 and displayed on the display device 22. The user can grasp the principal component score corresponding to the important feature amount that affects the performance of the material. The user can change a value of the principal component score corresponding to the important feature amount and enter it to the user terminal 2. The value of the principal component score entered by the user is transmitted to the server 3 and set to the reconstructor 43.

The reconstructor 43 changes the principal component score that has been determined to correspond to the important feature amount by the determiner. Then, the reconstructor 43 reconstructs a one-dimensional power spectrum on the basis of the changed principal component score and generates a changed image.

The determiner has regression/classification models including the principal component scores acquired by the analyzer 42 as explanatory variables and each material performance value as a target variable. The regression/classification models are constructed by machine learning. The regression/classification models are constructed using a known model. For example, the regression/classification models are constructed using a linear model such as Lasso or Ridge, or a decision tree model such as Random Forest, and the like. The determiner calculates, from a trained regression/classification model, a contribution of the explanatory variable to a target variable prediction. The contribution is calculated using a known technique. For example, when the regression/classification model is a linear model, the contribution is calculated based on regression coefficients. For example, when the regression/classification model is a decision tree model, the contribution is calculated based on Gini impurity or cross-entropy, and the like.

With the above-described determiner, the image analyzer 4 can limit the principal component scores to be changed to the principal component score corresponding to the important feature amount that affects the performance of the material. Accordingly, the image analyzer 4 can visualize which region in the image is changed by a change in the important feature amount that affects the performance of the material. Thus, the image analyzer 4 can visualize the features of the image representing the structure of the material and can visualize the correlation between the material performance and the feature amount of the image.

Although the embodiments of the present disclosure have been described in detail above, the present disclosure is not limited to the above embodiments, and various changes are possible in so far as they are within the spirit of the present disclosure. In the present disclosure, it is possible to add, to a configuration of an embodiment, a configuration of another embodiment, to replace a configuration of an embodiment with a configuration of another embodiment, or to delete a part of a configuration of an embodiment.

DESCRIPTION OF SYMBOLS

1 Information processing system
2 User terminal
21 Processing device
22 Display device
3 Server
4 Image analyzer
40 Processing device
41 Transformer
42 Analyzer
43 Reconstructor
45 Storage device
N Network

What is claimed is:

1. An image analyzer, comprising:
a transformer configured to perform a Fourier transform on each of a plurality of original images representing a structure of a material to acquire, for each of the plurality of original images, an amplitude spectrum and a phase spectrum, and to calculate a power spectrum on the basis of the acquired amplitude spectrum, thereby acquiring a plurality of power spectra;
an analyzer configured to perform principal component analysis on the plurality of power spectra and acquire principal components and principal component scores; and
a reconstructor configured to reconstruct an image based on the principal components and principal component scores and output a feature image representing features of an original image among the plurality of original images, the reconstructor being configured to:

generate a reconstructed no-change image obtained without changing the principal component scores as a reference image, calculate a first rate indicating a rate of change of a reconstructed power spectrum obtained by changing one or more of the principal component scores with respect to the power spectrum of the original image, modulate the amplitude spectrum of the original image according to the calculated first rate, generate a changed image based on the amplitude spectrum modulated according to the first rate and on the phase spectrum, generate a difference image based on the changed image and the reference image, and output the generated difference image as the feature image.

2. The image analyzer according to claim 1, wherein the reconstructor is configured to:

calculate a second rate indicating a rate of change of a reconstructed power spectrum obtained without changing the principal component scores with respect to the power spectrum of the original image;

modulate the amplitude spectrum of the original image according to the calculated second rate; and generate the reconstructed no-change image based on the amplitude spectrum modulated according to the second rate and on the phase spectrum.

3. The image analyzer according to claim 1, wherein the reconstructor is configured to:

calculate a differential power spectrum indicating a difference between a reconstructed power spectrum obtained by changing one or more of the principal component scores and a reconstructed power spectrum obtained without changing the principal component scores;

extract the differential power spectrum in a specified frequency range from the calculated differential power spectrum; and generate and output the difference image in the specified frequency range on the basis of the extracted differential power spectrum.

4. The image analyzer according to claim 1, wherein the reconstructor is configured to:

calculate a differential power spectrum indicating a difference between a reconstructed power spectrum obtained by changing one or more of the principal component scores and a reconstructed power spectrum obtained without changing the principal component scores;

specify a frequency range in which power values of the calculated differential power spectrum represent positive values, and a frequency range in which power values of the calculated differential power spectrum represent negative values; and separately generate the difference image in the frequency range in which the power values of the calculated differential power spectrum represent positive values and the difference image in the frequency range in which the power values of the calculated differential power spectrum represent negative values, and output the generated difference images.

* * * * *